US008899815B2

(12) United States Patent
Chen et al.

(10) Patent No.: US 8,899,815 B2
(45) Date of Patent: Dec. 2, 2014

(54) UNIFORM REFLECTIVE LIGHT-GUIDE APPARATUS WITH MICRO-STRUCTURE, AND BACKLIGHT MODULE AND LCD DEVICE HAVING THE SAME

(75) Inventors: Jia-Jen Chen, Taoyuan County (TW); Yu-Chun Tao, Taoyuan County (TW); Yan Zuo Chen, Taoyuan County (TW); Hao-Xiang Lin, Taoyuan County (TW); Cheng-Yu Hsieh, Taoyuan County (TW)

(73) Assignee: Entire Technology Co., Ltd. (TW)

( * ) Notice: Subject to any disclaimer, the term of this patent is extended or adjusted under 35 U.S.C. 154(b) by 538 days.

(21) Appl. No.: 13/135,992

(22) Filed: Jul. 20, 2011

(65) Prior Publication Data
US 2012/0026430 A1    Feb. 2, 2012

Related U.S. Application Data

(60) Provisional application No. 61/367,073, filed on Jul. 23, 2010.

(51) Int. Cl.
G02B 6/00 (2006.01)
F21V 8/00 (2006.01)
G02B 6/43 (2006.01)
G02F 1/1335 (2006.01)

(52) U.S. Cl.
CPC ........ *G02F 1/133615* (2013.01); *G02B 6/0038* (2013.01); *G02B 6/43* (2013.01); *G02B 6/0065* (2013.01); *G02B 6/0031* (2013.01); *G02B 6/0036* (2013.01); *G02B 6/0018* (2013.01); *G02B 6/0016* (2013.01); *G02B 6/0055* (2013.01)
USPC ........... 362/619; 362/616; 362/625; 362/612; 362/606

(58) Field of Classification Search
CPC .. G02B 6/0035; G02B 6/0038; G02B 6/0043; G02B 6/0053; G02B 6/0061; G02B 6/0068; G02F 1/133604
USPC ........ 362/606, 607, 612, 623–627, 617–620, 362/97.1–97.3
See application file for complete search history.

(56) References Cited

U.S. PATENT DOCUMENTS

| | | | |
|---|---|---|---|
| 6,954,237 B2* | 10/2005 | Ohizumi et al. | 349/63 |
| 7,356,235 B2* | 4/2008 | Choi et al. | 385/129 |
| 2007/0115569 A1* | 5/2007 | Tang et al. | 359/831 |
| 2007/0127267 A1* | 6/2007 | Chen | 362/626 |
| 2007/0217189 A1* | 9/2007 | Graham | 362/217 |
| 2011/0037925 A1* | 2/2011 | Park et al. | 349/64 |

* cited by examiner

Primary Examiner — Diane Lee
Assistant Examiner — Kenny C Sokolowski

(57) ABSTRACT

A uniform reflective light-guide for accompanying an edge light source to form a backlight module for an LCD display includes a light-guiding layer and a reflective layer. The light-guiding layer further defines a light-introducing surface and a light-exiting surface. The light-introducing surface is to allow lights emitted from the edge light source to enter the light-guiding layer. The light-exiting surface perpendicular to the light-introducing surface is to allow at least a portion of the lights to leave the light-guiding layer. The reflective layer is to reflect the incident lights back to the light-guiding layer. The reflective layer and the light-guiding layer are manufactured integrally into a unique piece by a co-extrusion process so as to avoid possible existence of an air spacing in between. A reflective surface is defined to interface the reflective layer and the light-guiding layer, and a three-dimensional micro-structure is constructed on the reflective surface.

10 Claims, 16 Drawing Sheets

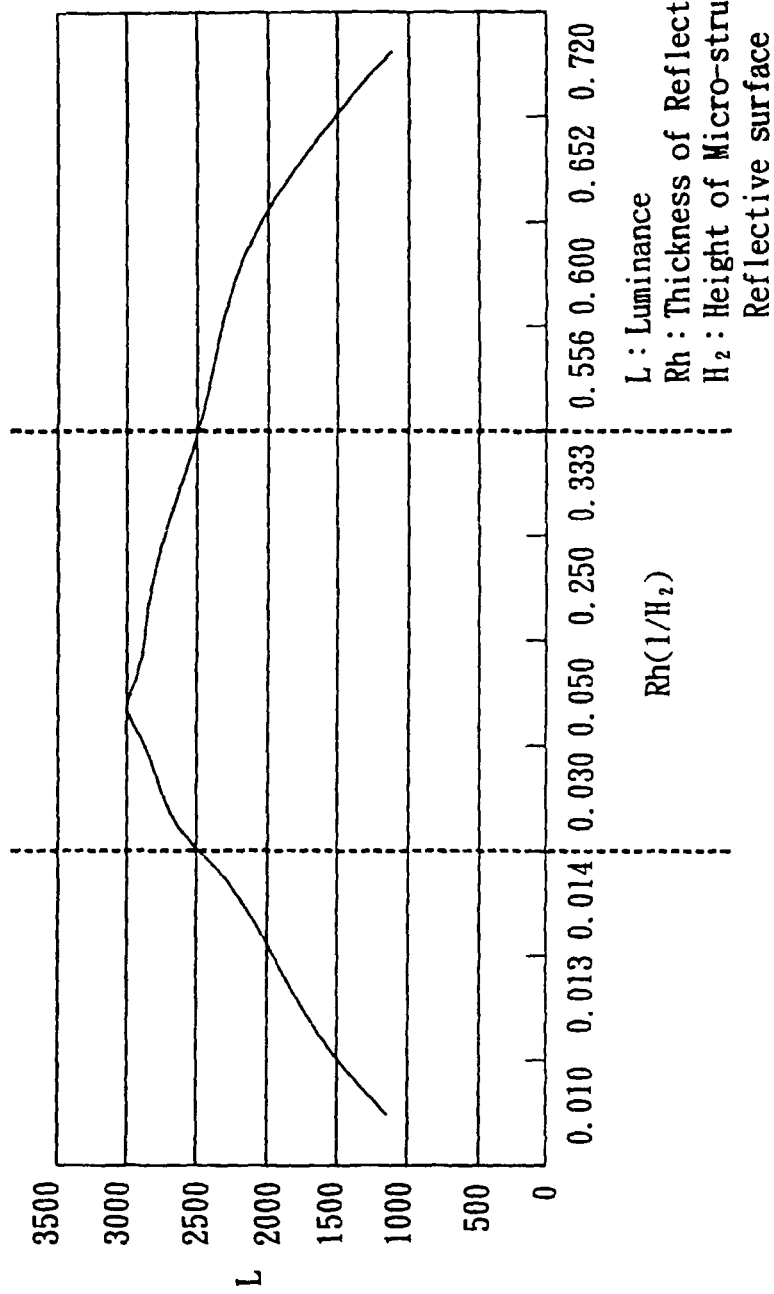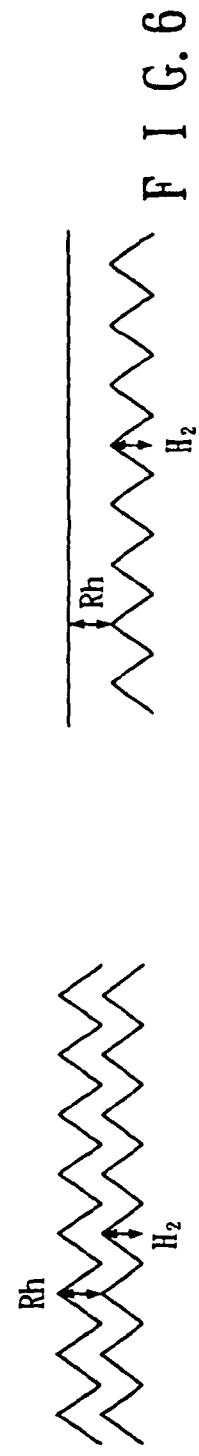
FIG. 6

| Reflective surface / Light-exiting surface | Smooth surface | continuous structuring | Non-continuous structuring & Single-side | Non-continuous structuring & DOUBle-side |
|---|---|---|---|---|
| Smooth surface | | ▨▨ ▭ | ▨▨ ⌇ | ▨▨ 4211/421/4212/42 ⌇ 4221/422/4222 |
| continuous structuring | ▨▨ 4111/411/4112 ⌇ 4121/412/4122 / 41 | ▨▨ ⌇ | ▨▨ ⌇ | ▨▨ ⌇ |
| Non-continuous structuring & Single-side | ▨▨ ⌇ | ▨▨ ⌇ | ▨▨ ⌇ | |
| Non-continuous structuring & Double-side | ▨▨ ⌇ | ▨▨ ⌇ | | ▨▨ ⌇ |

F I G. 7

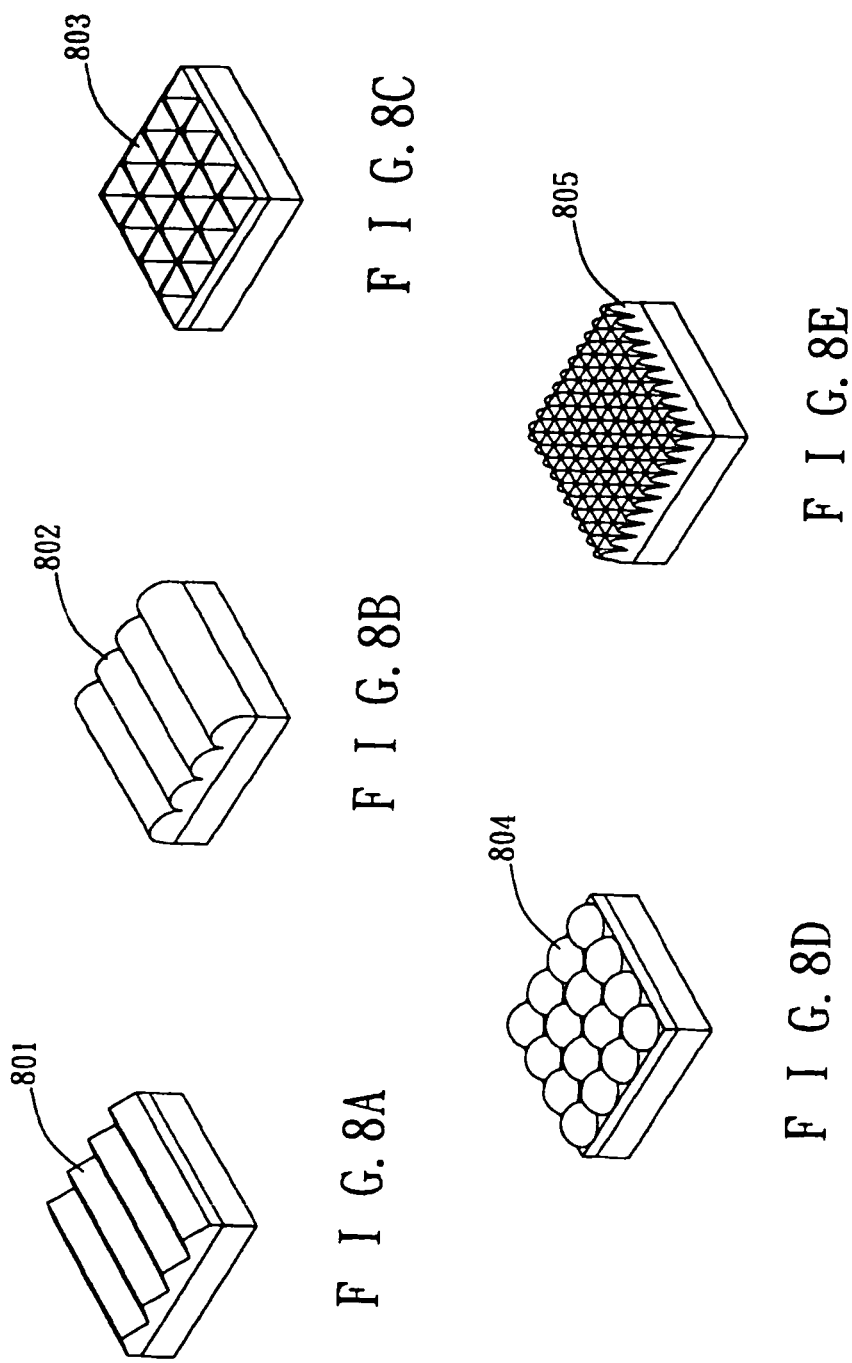

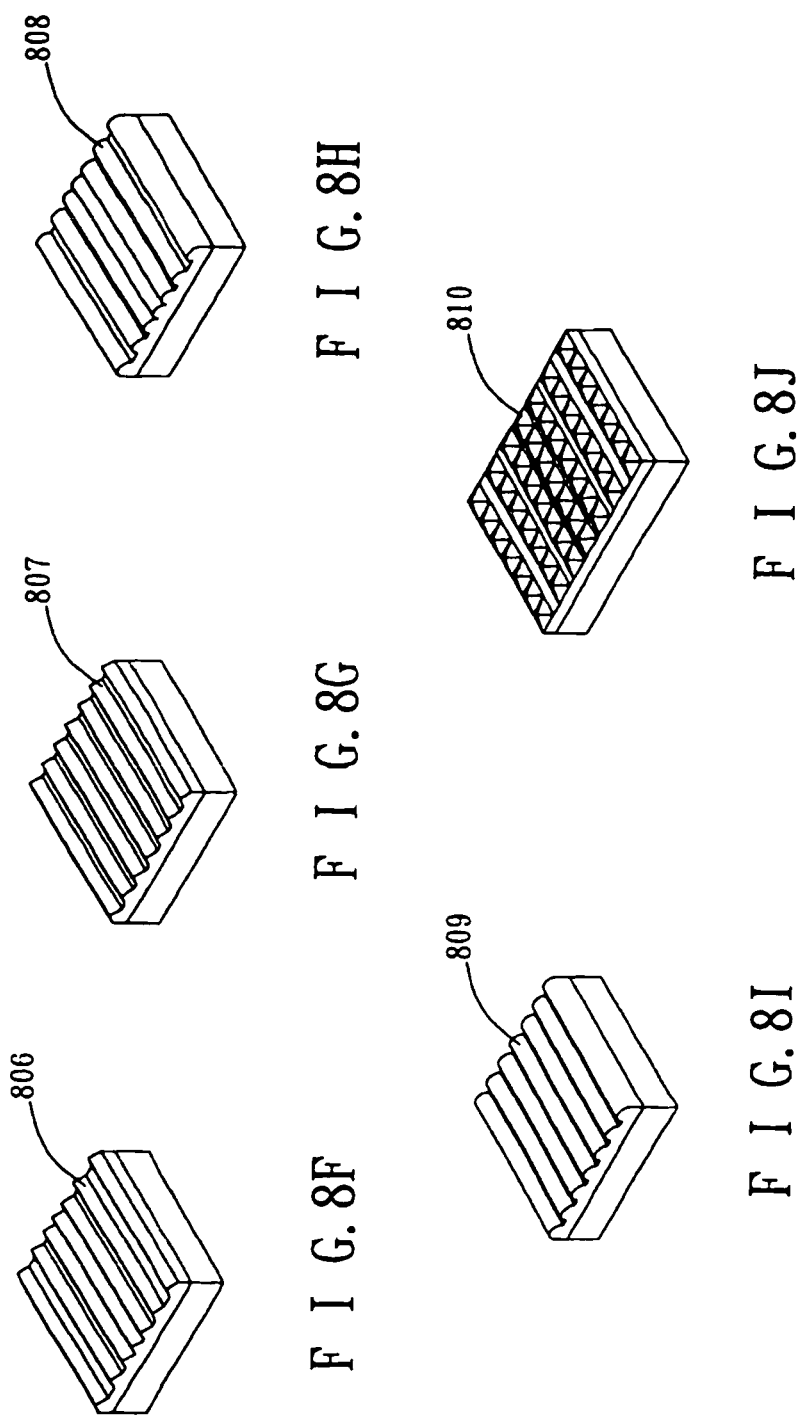

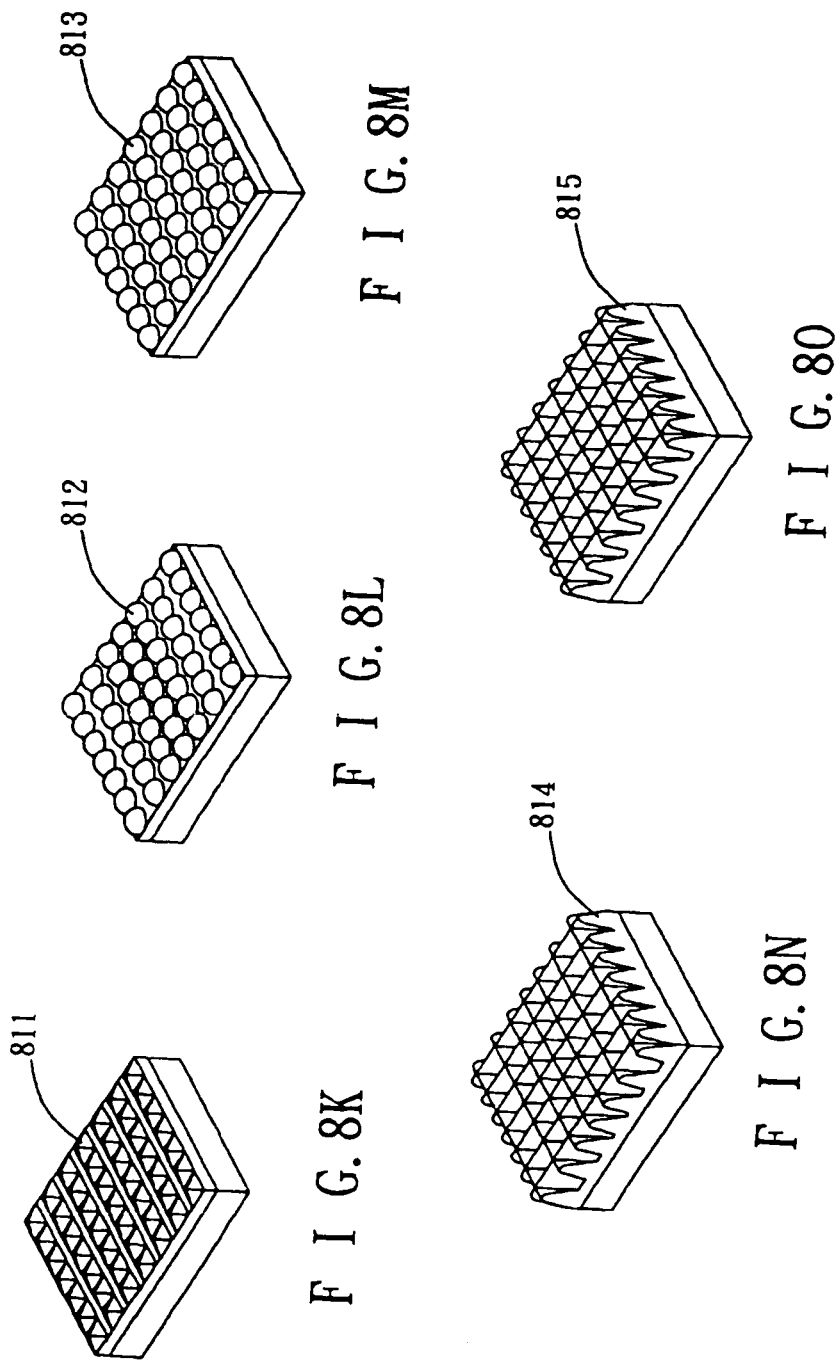

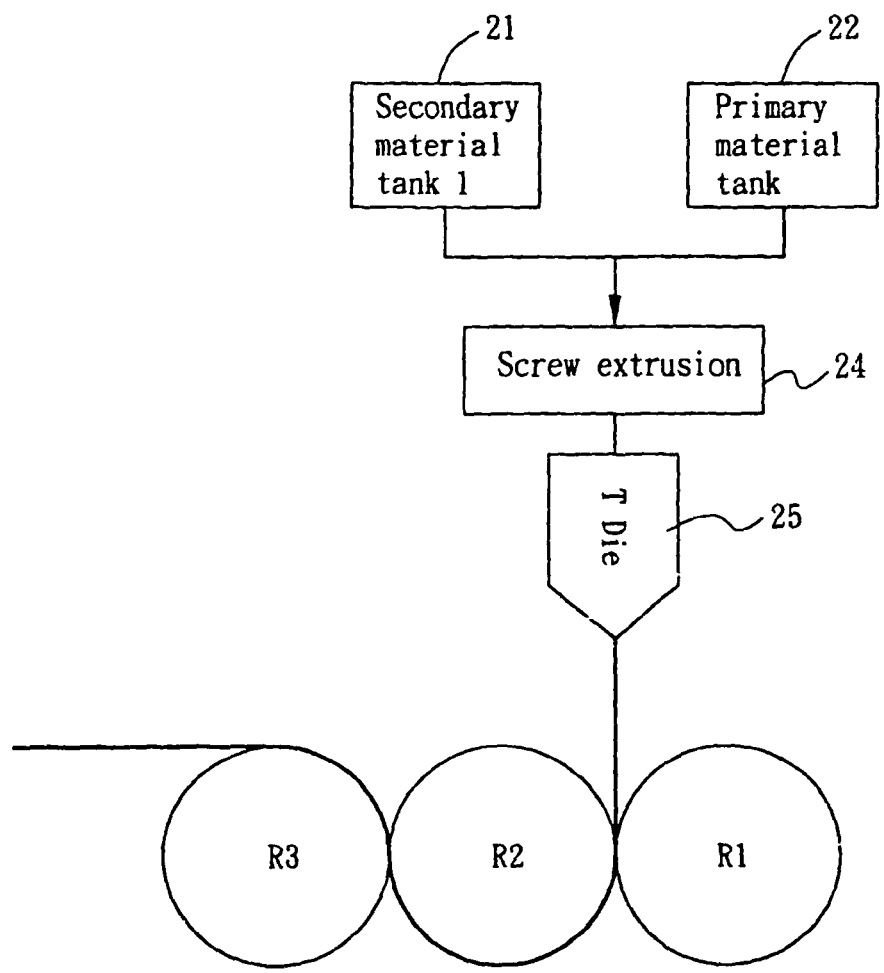
F I G. 11

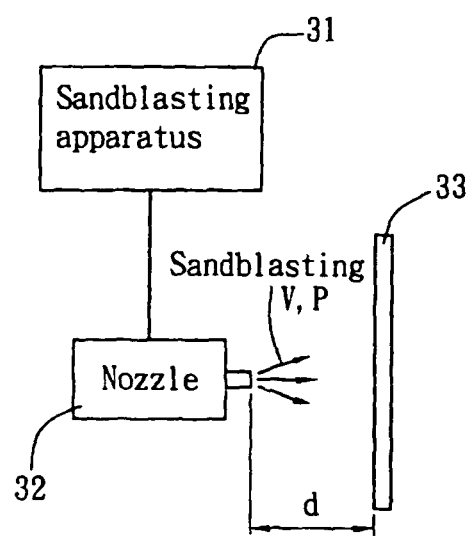
F I G. 12

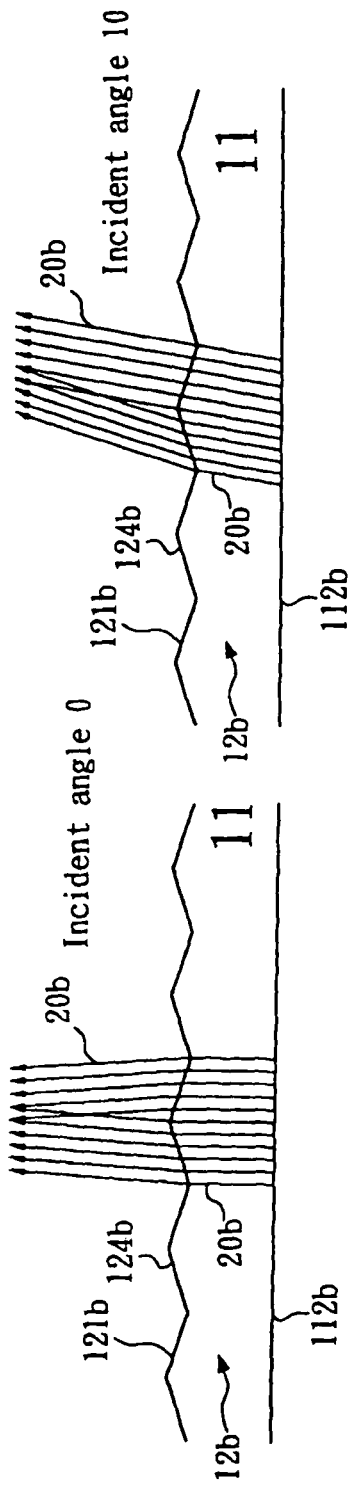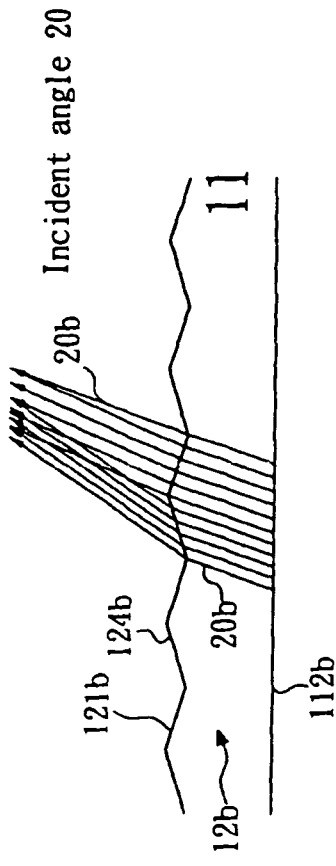
F I G. 13A
F I G. 13B
F I G. 13C

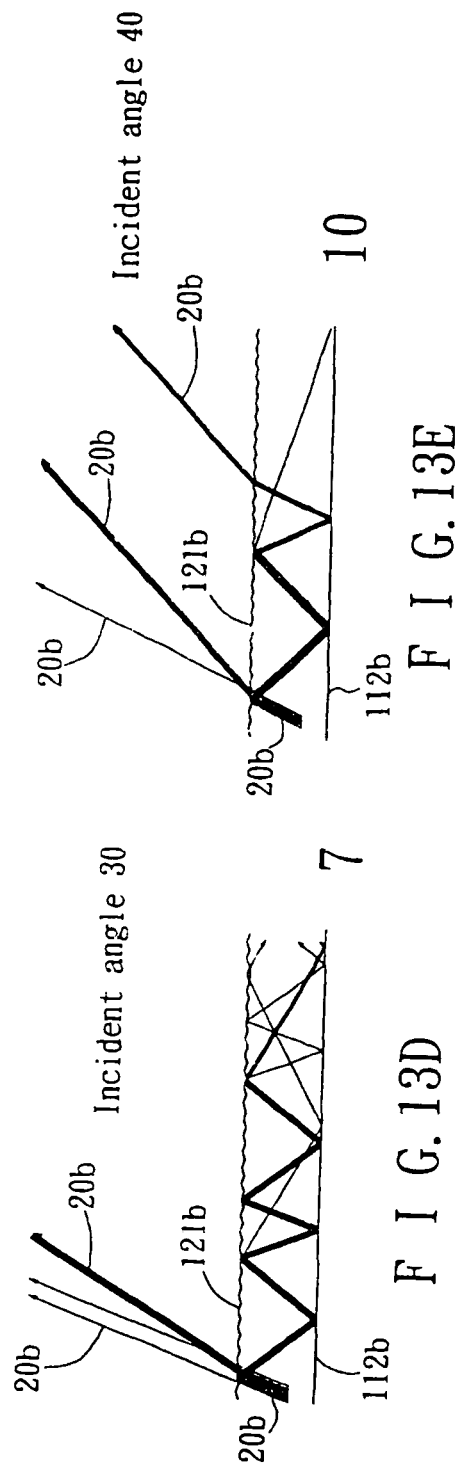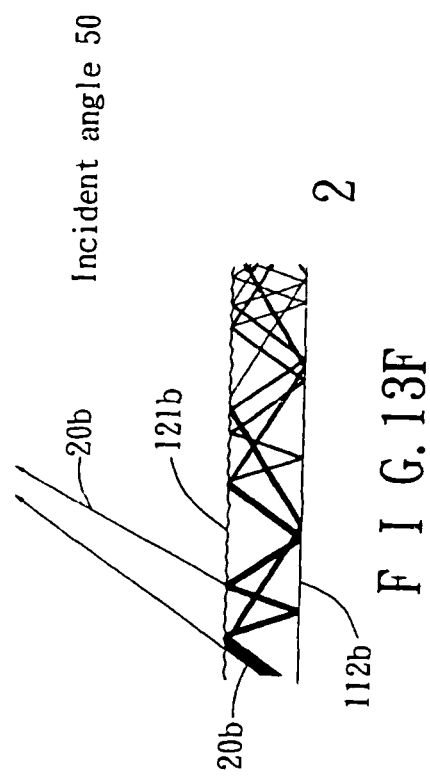

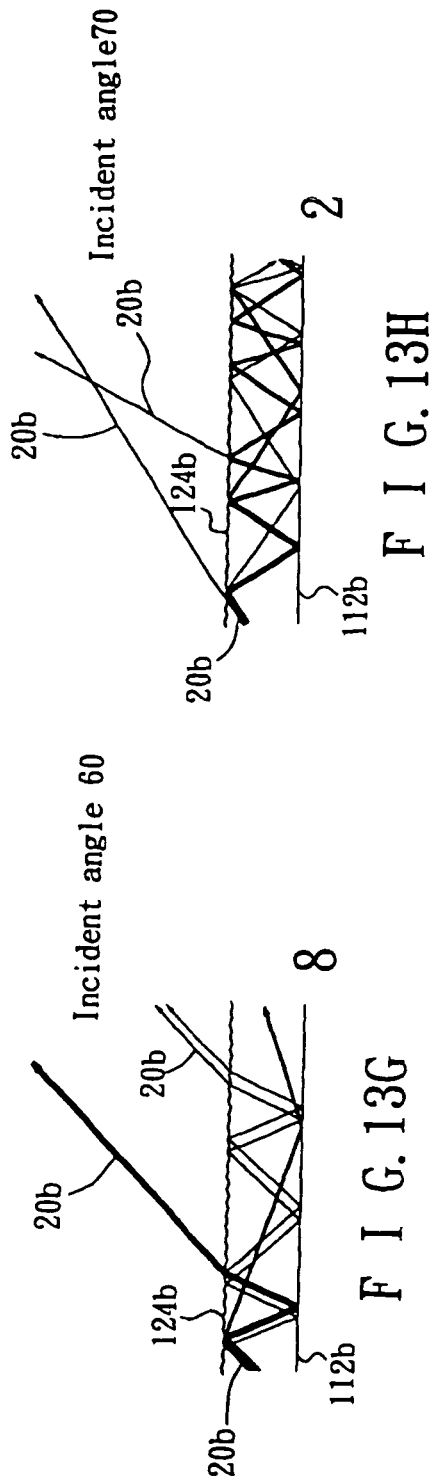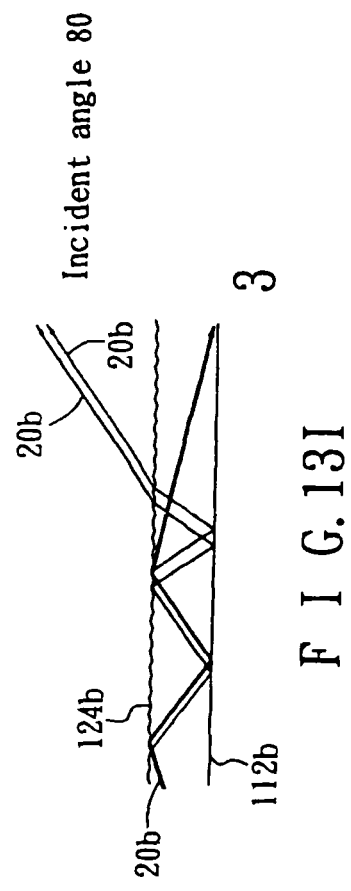
FIG. 13G  
FIG. 13H  
FIG. 13I

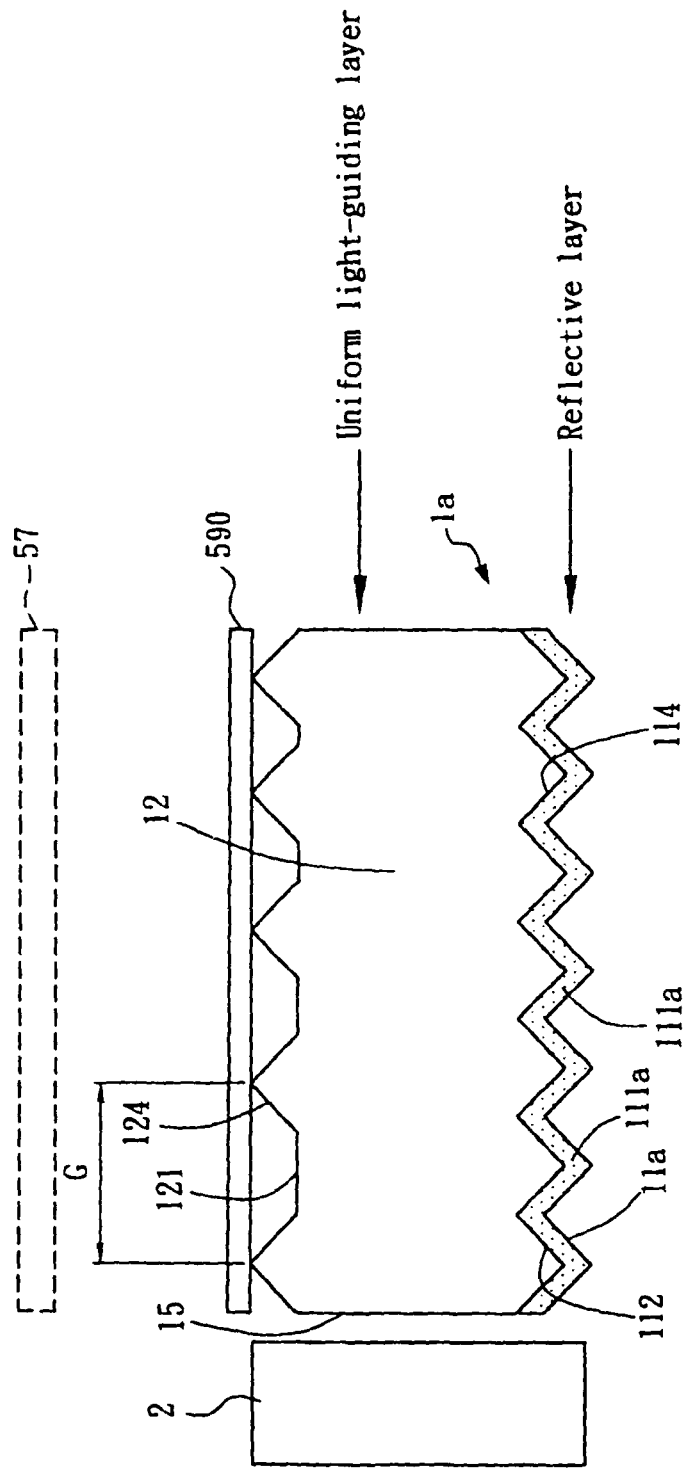
F I G. 14

UNIFORM REFLECTIVE LIGHT-GUIDE APPARATUS WITH MICRO-STRUCTURE, AND BACKLIGHT MODULE AND LCD DEVICE HAVING THE SAME

This invention claims priority to U.S. Provisional Application 61/367,073 filed Jul. 23, 2010 and is incorporated by reference in its entirety.

BACKGROUND OF THE INVENTION (1) Field of the Invention

The invention relates to a light-guide apparatus with micro-structure, and more particularly to the light-guide apparatus which is manufactured by a co-extrusion process and capable of light reflection, distribution and guiding. The light-guide apparatus can integrate an edge light source to perform as a backlight module for display devices.

(2) Description of the Prior Art

A light-guide plate is known to be a light-guide medium for a backlight module of display devices. The light-guide plate can be used as an edge-type module that guides lights emitted by an edge light source to leave vertically from a front surface of the display device so as to enhance the luminance and distribution of the display device.

Theoretically, the light-guide plate is to direct the incident lights to a particular side (usually the front surface) of the plate. The lateral side of the plate can diffuse to reflect the lights back into the plate and to leave from the front surface of the plate. A high refraction index of the plate usually implies a better light-guiding performance. Also, the bottom surface of the light-guide plate is usually formed as a reflection surface to send back lights into the plate and so as to have the light leave the plate at the targeted front surface.

Referred to FIG. 1, a conventional backlight assembly 5 disclosed in a US patent (U.S. Pat. No. 7,108,385, filed on Sep. 19, 2006) is shown to have an LCD panel 57, a diffusing film 56, a lens module 55, a light source module 50, and a light-guide module. The light-guide module further includes a front surface 523 for leaving the lights, a light-guide plate 520 and a reflection plate 524. The edge-type light source 50 energized and controlled by a circuit board 51 is attached to a lateral side 521 of the light-guide module.

In the art, the backlight assembly like the one shown in FIG. 1 usually has the following shortcomings in individual parts. These shortcomings in parts of the conventional backlight assembly are listed as follows in Table 1.

TABLE 1

Shortcomings in parts of a conventional backlight assembly

| Part | Function | Shortcomings |
| --- | --- | --- |
| Reflection plate 524 | To reflect incident lights back into the light-guide plate | Increasing the light loss and thus reducing the light utilization efficiency by the spacing in between with the light-guide plate<br>Increasing the cost of the backlight assembly |
| Light-guide plate 520 | To forward lights from the edge-type light source to the front surface | Ill-visibility caused by line defects from the necessary netting structure<br>Needing the diffusing film to cure the line defects |
| Diffusing film 56 | To homogenize the lights in the light-guide plate, and to protect the lens | Increasing the cost of the backlight assembly |

TABLE 1-continued

Shortcomings in parts of a conventional backlight assembly

| Part | Function | Shortcomings |
| --- | --- | --- |
| | module from possible scratches | |
| Lens module 55 (BEF) | To coverage the lights, and to enhance the luminosity | Increasing the cost of the backlight assembly by difficulties in manufacturing and design<br>Vulnerable to break and scratch<br>Causing redundant working cost in view of the working in the micro-structure of the light-guide plate |

Referred to FIG. 2, a lateral view of the light-guide plate 520 is shown to elucidate one of the aforesaid shortcomings in light loss of the light-guide plate 520 during a light transmission path. In order to increase the reflection efficiency of the backlight assembly 5, the additional reflection plate 524 is recommended to be included. Because a tiny air spacing 525 is always there between the reflection plate 524 and the light-guide plate 520, a loss in light 581 up to about 8% is inevitable. Such a light loss in between would decrease the light utilization efficiency but increase the manufacturing cost of the backlight assembly 5.

In addition, the light-guide plate in the art can be produced by applying an additional printing process, which involves steps of screen format preparing, inking and screen printing. All these complicated processes may contribute mainly to shortcomings in production yield and glazing bands. As shown in FIG. 3, glazing bands on a conventional light-guide plate 520 is schematically illustrated. These glazing bands may result in non-uniform brightness distribution to the light-guide plate 520; for example, to separate the screen into a bright area 582, a middle area 583 and a dark area 584.

As described above, the air spacing existing between the light-guide plate and the reflection plate can contribute to the increased light loss, the cost hike in producing the backlight assembly, the line defects, the manufacturing difficulty in the lens module and damages to the surface micro-structure. Hence, improvement upon overcoming the air spacing between plates shall be highly expected by the skill person in the art.

SUMMARY OF THE INVENTION

Accordingly, it is a primary object of the present invention to provide a uniform reflective light-guide apparatus with micro-structure, a backlight module and an LCD display having the same. By introducing the uniform reflective light-guide apparatus which is unique-piece formed as a double-layer laminating plate by a co-extrusion process, the aforesaid shortcomings in light utilization efficiency, light uniformity, light luminance, production cost for backlight module and necessitating of the lens module can be improved.

To achieve the foregoing object, the uniform reflective light-guide apparatus with micro-structure in accordance with the present invention is introduced to accompany an edge light source to form a backlight module for an LCD display. The uniform reflective light-guide apparatus includes at least a light-guiding layer and a reflective layer.

The light-guiding layer further defines a light-introducing surface and a light-exiting surface. The light-introducing surface is to allow lights emitted from the edge light source to enter therethrough the light-guiding layer. The light-exiting surface, preferably perpendicular to the light-introducing surface, is to allow at least a portion of the lights in the light-guiding layer to leave the light-guiding layer as well as the light-guide apparatus.

The reflective layer laminated to pair the light-guiding layer is to reflect the incident lights from the light-guiding layer back to the light-guiding layer.

In the present invention, the reflective layer and the light-guiding layer are manufactured integrally into a unique piece by a co-extrusion process so as to avoid possible existence of air spacing between the reflective layer and the light-guiding layer. Further, a reflective surface is defined to an interface between the reflective layer and the light-guiding layer, and a three-dimensional micro structure is constructed onto the reflective surface. Preferably, the micro structure is formed as a thin layer laminated between the light-guiding layer and the reflective layer.

In one preferred embodiment of the present invention, the light-exiting surface has thereon another micro-structure. Both the micro-structures of the light-exiting surface and the reflective surface satisfy the following criterion:

$$1.6E\text{-}02 \leq (H1/P1)*(H2/P2) \leq 1.21E\text{-}01,$$

wherein the H1 is a depth (or height) of the micro-structure of the light-exiting surface, the P1 is a width of the micro-structure of the light-exiting surface, the H2 is a depth (or height) of the micro-structure of the reflective surface, and the P2 is a width of the micro-structure of the reflective surface.

In one preferred embodiment of the present invention, the uniform reflective light-guide apparatus with micro-structure further satisfies one of the following two criteria:

(1) $0.02 < Rh(1/H2) < 0.5$, wherein the Rh is a thickness of the reflective layer, the H2 is the depth of the micro-structure of the reflective layer; and (2) $0.03 < H2/P2 < 0.8$, wherein the P2 is the width of the micro-structure of the reflective surface.

In one preferred embodiment of the present invention, the micro-structure of the light-exiting surface is formed as a non-continuous micro-structure commonly having an interval G in between thereof ranged from 0 to 1.4 mm.

In one preferred embodiment of the present invention, the uniform reflective light-guide apparatus with micro-structure further includes at least one of the following:

a plurality of diffusing particles, mixed in the light-guiding layer;

two plastics with different refractive indexes, mixed in the reflective layer;

a plurality of reflective particles, mixed in the reflective layer; and one of a coarse surface and a matted surface with a controllable transmittance, formed on the light-exiting surface.

BRIEF DESCRIPTION OF THE DRAWINGS

The present invention will now be specified with reference to its preferred embodiment illustrated in the drawings, in which:

FIG. 6 illustrates a plot for elucidating the luminance change of the uniform reflective light-guide apparatus with micro-structure in accordance with the present invention;

FIG. 7 illustrates various patterns applicable to the light-introducing surface and the light-exiting surface of the uniform reflective light-guide apparatus with micro-structure in accordance with the present invention;

FIG. 8A through FIG. 8O show various embodiments of the micro-structure of the uniform reflective light-guide apparatus in accordance with the present invention;

FIG. 11 shows a block diagram for the co-extrusion process of FIG. 10;

FIG. 12 shows a block diagram for a sandblasting process to form a coarse surface of the uniform reflective light-guide apparatus with micro-structure in accordance with the present invention;

FIG. 13A through FIG. 13I show light reflection on different micro-structures with respect to various incident angles (ranged from 10 degrees to 80 degrees) for the uniform reflective light-guide apparatus in accordance with the present invention; and FIG. 14 shows schematically an embodiment of an LED display having the uniform reflective light-guide apparatus with micro-structure in accordance with the present invention.

DESCRIPTION OF THE PREFERRED EMBODIMENT

The invention disclosed herein is directed to a uniform reflective light-guide apparatus with micro-structure, a backlight module having the same light-guide apparatus, and an LCD display having the same light-guide apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

To better and clearly describe the uniform reflective light-guide apparatus with micro-structure according to the present invention and the backlight module as well as the LCD display applying this light-guide apparatus, following descriptions will be detailed by accompanying figures.

Figure 4:
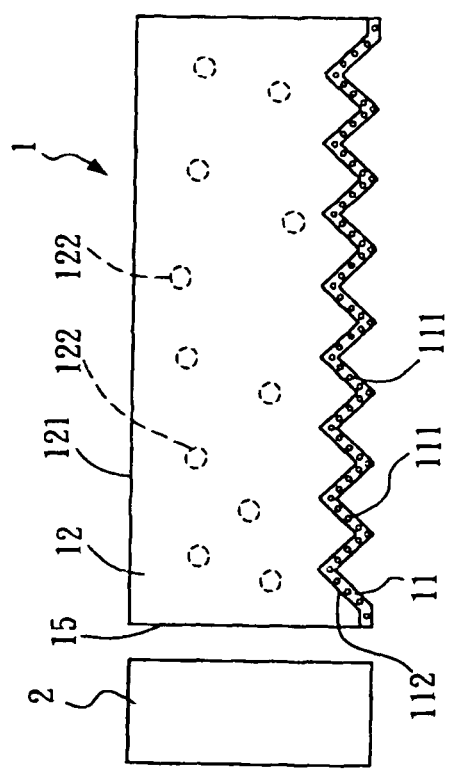
FIG. 4 shows schematically a first embodiment of the uniform reflective light-guide apparatus with micro-structure in accordance with the present invention.

(I) Briefing of the Present Invention on the Double-Layer Laminating Plate of the Light-Guide Apparatus:

As shown in FIG. 4, the uniform reflective light-guide apparatus 1 with micro-structure, particularly an all-in-one light-guide apparatus, includes a light-guiding layer, a reflective layer and a reflective surface interfacing in between and having a micro-structure thereon, integrally as a unique piece by a co-extrusion process. Upon such an arrangement, a single light-guide apparatus of the present invention can achieve functions in light-distributing, light-guiding and light-reflecting. Such an apparatus can be also applied to a large-scale panel by accompanying any kind of edge light source 2. The main body of the light-guide apparatus 1 mainly includes:

a micro-structured reflective layer 11;

a micro-structured light-guiding layer 12; and a light-exiting surface 121 of the light-guiding layer having a surface roughness (Ra).

As shown in FIG. 4, the main body of the light-guide apparatus 1 with micro-structure can be a simple one-piece double-layer plate which can be produced by a co-extrusion process.

(II) Briefing of the Present Invention on the Reflective Layer 11 (the Lower Layer):

In the present invention, one of many important design concepts of the uniform reflective light-guide apparatus 1 with micro-structure is to apply an edge light source 2 to replace the conventional net-type light source. Also, the micro-structure is formed on a reflective surface between the reflective layer 11 and the light-guiding layer 11 to replace the conventional reflective plate. By applying the diffusing particles in the light-guiding layer 12, the line or point light source can be homogenized and transformed into a surface light source. By providing the surface light source and the micro-structure formed between the light-guiding layer 12 and the reflective layer 11, the noble light-guide apparatus 1 successfully to replace the conventional reflective plate can thus have multiple functions in light reflection, light-guiding and light distribution.

Figure 1:
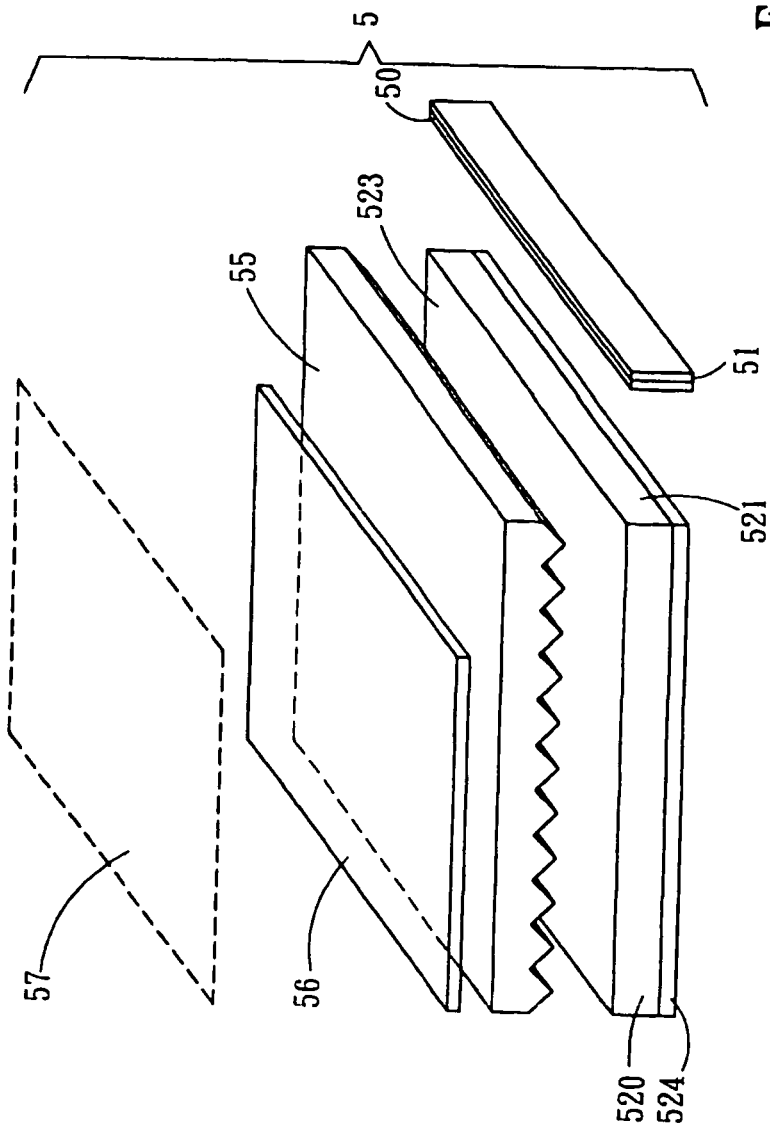
FIG. 1 is a schematic exploded view of a conventional backlight assembly.
Figures 2, 3:
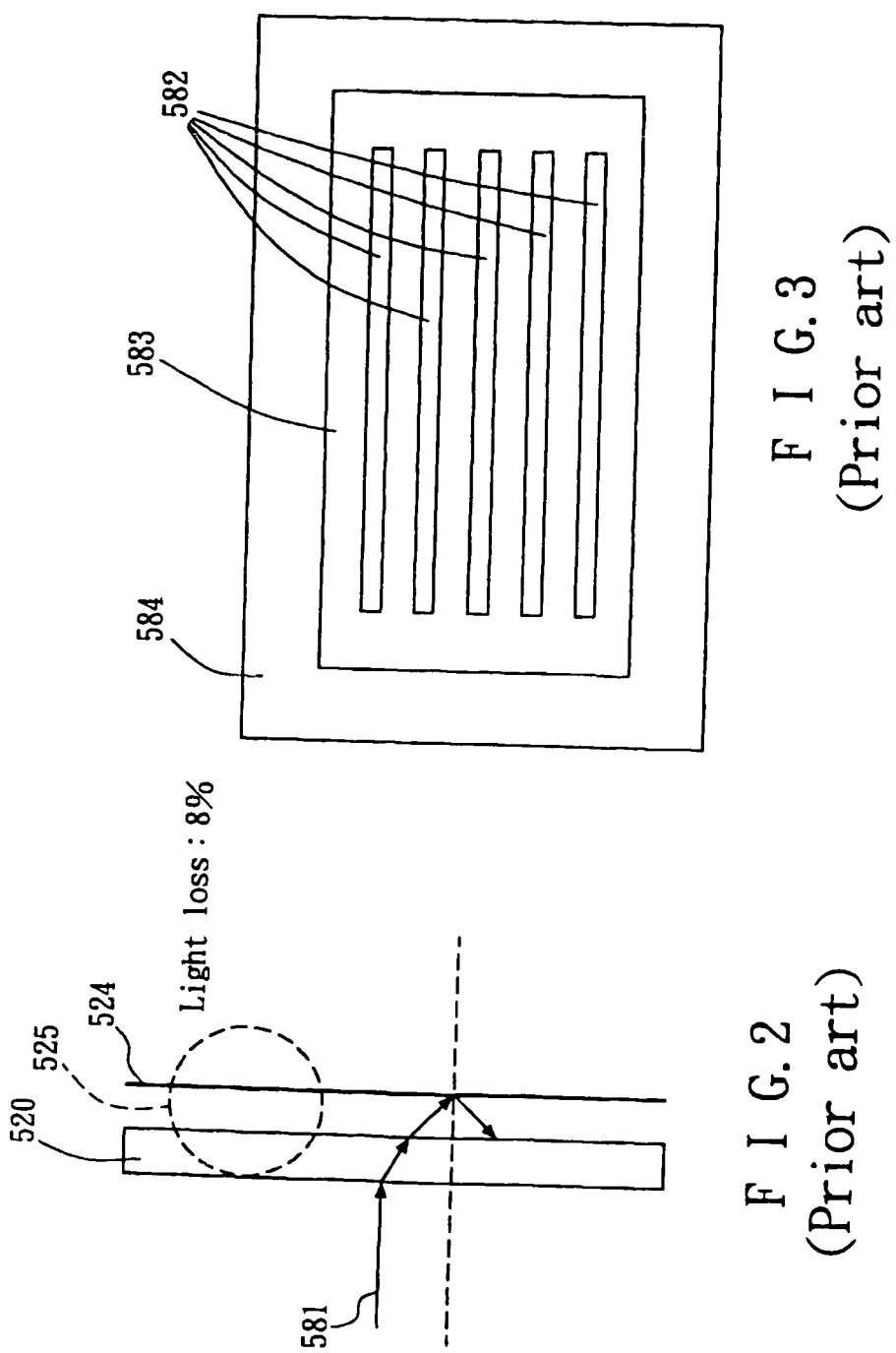
FIG. 2 is a lateral view of the light-guide plate and the diffusing plate of FIG. 1.
FIG. 3 shows possible line defects of FIG. 1.
Figure 5:
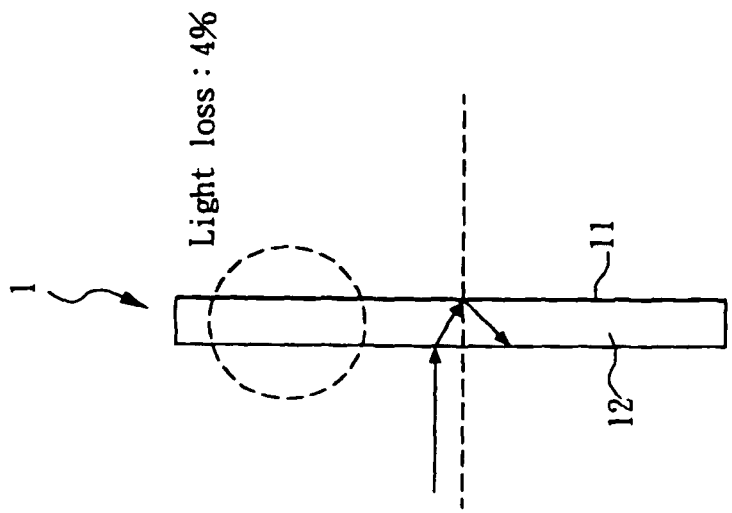
FIG. 5 shows how the apparatus of FIG. 4 can reduce the light loss.

By providing the aforesaid change, a substantial improvement in light loss can be gained by removing the reflective plate. As shown in FIG. 5, the uniform reflective light-guide apparatus 1 with micro-structure adds a micro-structure and a reflective layer 11 to the bottom surface of the light-guiding layer 12. Further by simultaneously forming these three structures (the light-guiding layer 12, the micro-structure and the reflective layer 11), the existence of air spacing between the reflective layer 11 and the light-guiding layer 12 can be completely neglected, by compared to that shown in FIG. 2. Upon such an arrangement, the light utilization efficiency of the light-guide apparatus 1 of the present invention can be increased. Also, the micro-structure can contribute to the light-guiding layer 12 in light reflection and diffusion, such that the light loss of the light-guide apparatus of the present invention can be reduced to no more than 4%. Further, due to the manufacturing process for the light-guide apparatus 1 in accordance with the present invention is simplified, the film-adhering process, the process for producing the backlight module and the overall cost can be substantially reduced.

In the present invention, a preferred embodiment of the reflective layer 11 for the light-guide apparatus 1 with micro-structure can include the following features.

(1) The reflective layer 11 is produced by mixing two plastics with different refraction indexes, or by adding a predetermined amount of reflective particles into the matrix or plastics of the reflective layer 11.

(2) In the case that two plastics with different refraction indexes are used to form the base matrix of the reflective layer, the mixture rate can be a ratio of 7:3.

(3) In the case that the reflective particles 111 are introduced into the reflective layer 11, the refraction index for the reflective particle 111 can be ranged from 2.2~3.2, and the weight proportion of the reflective particles 111 can be less than 0.5%.

(4) The granular size of the reflective particles 111 can be ranged between 1-100 μm, preferable between 4-50 μm.

(5) The refraction index for the base matrix or plastics of the reflective layer 11 is ranged between 1.6-2.5.

(6) The difference in refraction index (Δn) between the reflective layer 11 and the light-guiding layer is ranged between 0.05-1.

(III) Briefing of the Present Invention on the Light-Guiding Layer 12 (the Upper Layer):

In the present invention, a preferred embodiment of the uniform reflective light-guide apparatus 1 with micro-structure can add a plurality of micro diffusing particles into the light-guiding layer 12 so as to transform the original line or point light source into a surface light source. Upon such an arrangement, the performance in the light distribution can be improved, and the light utilization efficiency can be increased by utilizing materials with different refraction indexes.

In the present invention, a preferred embodiment of the light-guiding layer 12 for the light-guide apparatus 1 can include the following features.

(1) The light-guiding layer 12 is added by a small amount of diffusing particles 122 or is matt finished at the light-exiting surface 121.

(2) The difference in refraction index (Δn) between the diffusing particles 122 and the light-guiding layer 12 is limited to 0.04<Δn<0.1.

(3) The granular size of the diffusing particles 122 is ranged between 2~10 μm.

(4) The surface roughness (Ra) of the surface (the light-exiting surface 121) of the light-guiding layer 12 is defined as 1 μm<Ra<6 μm, so as to enhance the luminance and uniformity.

(5) The refraction index for the base matrix or plastics of the light-guiding layer 12 is ranged between 1.42-1.63.

(IV) Briefing of the Present Invention on the Micro-Structure:

In the present invention, the reflective surface is defined to the interface between the light-guiding layer 12 and the reflective layer 11. Namely, to the double-layer laminating plate structure of the light-guide apparatus 1 of the present invention, the reflective surface is bottom to the light-guiding layer 12 but top to the reflective layer 11. A plurality of micro-structures of the present invention is formed on the reflective surface. In the present invention, intervals for separating these micro-structures can be the same interval, unequal intervals, or alternative-arranged intervals. Each of the micro-structures can be a three-dimensional miniaturized unit or protrusion (such as a pyramid-shape structure) that provides multiple symmetrical or unsymmetrical rising surfaces for omni-directional reflection. These three-dimensional miniaturized protrusions can be triangular structures, pillar structures, round-tip or arc structures and so on. In the preferred embodiment of the micro-structures in accordance with the present invention, following two criteria are satisfied.

(1) 0.03<H2/P2<0.8, wherein H2 and P2 are the depth and the width of the micro-structure on the reflective surface, respectively; preferably, 80 μm<P2<250 μm.

(2) 0.02<Rh(1/H2)<0.5 for boosting the reflection and light-guide performance of the apparatus 1, wherein the Rh is a thickness of the reflective layer.

(V) Briefing of the Present Invention on the Relationship Between the Light-Guiding Efficiency and the Thickness of the Reflective Layer 11 (the Lower Layer):

In the present invention, a preferred thickness range of the reflective layer 11 can be obtained by evaluating the relation between the thickness of the reflective layer 11 and the amount of incident rays. Preferably, the thickness of the reflective layer 11 shall be less than 1/10 of the total thickness of the plate body (including the light-guiding layer 12 and the reflective layer 11).

(VI) Briefing of the Present Invention on the Relationship Between the Thickness of the Reflective Layer 11 (the Lower Layer) and the Depth of the Micro-Structure:

Referring to FIG. 6, a curve plot for elucidating the luminance change of the uniform reflective light-guide apparatus 1 with micro-structure in accordance with the present invention is present. In the plot, the Y-axis is the luminance value detected at the light-exiting surface, while the X-axis is the value of Rh(1/H2) as described above. As shown at the lower left corner of FIG. 6, in the case that both sides of the reflective layer are individually formed as continuous-extending triangular conical micro-structures, the Rh is measured at a vertical line penetrating a tip of the triangular conical micro-structure, belonged either to the upper or the lower micro-structure. Also, the depth of the micro-structure (H2) is measured at either the upper or the lower micro-structure for the height of a unit triangular conical micro-structure. As shown at the lower right corner of FIG. 6, in the case that only one side (the lower side) of the reflective layer is to form the continuous-extending triangular conical micro-structure, the Rh is measured as the vertical distance between a tip of the triangular conical micro-structure at the lower surface thereof and the upper flat surface. Similarly, the depth of the micro-structure (H2) is measured at the lower micro-structure for the height of a unit triangular conical micro-structure.

Hence, according to the data shown in FIG. 6, different values of Rh(1/H2) do vary the luminance of the apparatus of the invention. It is noted that, when 0.02<Rh(1/H2)<0.8, satisfied performance in both the reflection and the light-guide can be achieved. Within this range, the reflection rate of the reflective layer is about 80%. Anything beyond this range implies a poor performance in either the reflection rate or the uniformity. Further, when 0.02<Rh(1/H2)<0.5, optimal performance in both the reflection and the light-guide of the apparatus (i.e. the luminance performance at the light-exiting surface) can be achieved.

(VII) Briefing of the Present Invention on the Relationship Among Thickness, Concentration and Uniformity of the Light-Guiding Layer 12 (the Upper Layer):

In the present invention, relationship among thickness, concentration and uniformity for a preferred embodiment of the light-guiding layer 12 may have the following features.

(1) The micro-structured light-guiding layer 12 is added by a small amount of diffusing particles to resolve problems in line defects and ill-uniformity.

(2) The smaller the granular size of the diffusing particle is, the narrower the identical penetration distribution is.

(3) When the granular size of the diffusing particle becomes larger, the identical penetration distribution will become broader.

(4) The difference in refraction index, the granular size and the corresponding concentration of the diffusing particles in the light-guiding layer 12 are all control parameters to the aforesaid relationship.

In the present invention, problems of the light-guide apparatus 1 in line defects and ill uniformity can be resolved by introducing or doping a small amount of diffusing particles into the light-guiding layer 12. Also, thereby, the light utilization rate of the apparatus 1 can be enhanced. When the difference of the refraction rates between the diffusing particles and the plastic matrix of the light-guiding layer 12 is limited to 0.04<Δn<0.1, a higher light penetration rate can be maintained.

In addition, the thickness of the light-guiding layer 12 and the concentration of the diffusing particles are highly related to the luminance and uniformity of the apparatus 1.

In the present invention, following structures of the apparatus 1 are related to performance of the light-guiding layer 12 in surface roughness and luminance.

(1) The roughness of the surface (light-exiting surface 121) of the light-guiding layer 12 is in favor to the luminance of the light-guiding layer 12.

(2) The distribution in roughness of the surface (light-exiting surface 121) of the light-guiding layer 12 is varied with the concentration of the diffusing particles.

In summary, the roughness (Ra) on the surface (light-exiting surface 121) of the light-guiding layer 12 has the following merits: (1) to increase the luminance of the light-guiding layer; (2) to resolve the line defects; (3) to enhance the uniformity.

In the present invention, a better luminance (L) can be obtained while the surface roughness (Ra) on the surface (light-exiting surface 121) of the light-guiding layer 12 is limited to the range of 1 μm to 6 μm.

(VIII) Briefing of the Present Invention on Various Embodiment Aspects of the Uniform Reflective Light-Guide Apparatus with Micro-Structure:

In the uniform reflective light-guide apparatus 1 with micro-structure of the present invention, the diffusing particles 122 are optional to the light-guiding layer 12, and the upper surface (the light-exiting surface 121) of the light-guiding layer 12 can be a mirror surface, a matted surface, a design with continuous micro-structures, a design of non-continuous micro-structures with single-side edge lighting, a design of non-continuous microstructures with dual-side edge lighting, or any other appropriate design. Hence, to pair the reflective layer 11 and the light-guiding layer 12 by mixing the aforesaid designs, all possible pairs applicable to the apparatus 1 of the present invention can be shown in FIG. 7. For example, in the position 41 of FIG. 7, the object 411 illustrates a structure having a light-guiding layer doped with diffusing particles, a continuous design at the upper surface (the light-exiting surface 4111) of the light-guiding layer, and a mirror or matted surface design at the reflective surface 4112 interfacing the light-guiding layer and the reflective layer. Also, in the same position 41 of FIG. 7, the object 412 illustrates a structure having a light-guiding layer without diffusing particles, a continuous design at the upper surface (the light-exiting surface 4121) of the light-guiding layer, and a mirror or matted surface design at the reflective surface 4122 interfacing the light-guiding layer and the reflective layer.

In another position 42 of FIG. 7, the objects 421 and 422 illustrate structures having light-guiding layers respectively with and without diffusing particles. Yet, both the objects 421 and 422 include individually a mirror or matted surface design at the upper surface (the light-exiting surface 4211, 4221) of the light-guiding layer, also another mirror or matted surface design at the reflective surface 4212, 4222 interfacing the light-guiding layer and the reflective layer, and non-continuous micro-structures with dual-side edge lighting.

In the present invention, both the light-exiting surface and the reflective surface can have micro-structures, no matter if they are continuous, non-continuous, single-side lighting, or dual-side lighting. In such embodiments, the directional arrangement of the micro-structures on the light-exiting surface with respect to that on the reflective surface can be parallel or orthogonal.

In the present invention, besides the pairing of the light-exiting surface and the reflective surface of the uniform reflective light-guide apparatus 1 with micro-structure can be versatile as described above, the structuring or the configuration of the micro-structures constructed on the light-exiting surface and/or the reflective surface can be also various. Embodiments to illustrate such a declamation are shown in, but not limited to, FIG. 8A through FIG. 8O, which will be elucidated orderly in the following paragraphs.

Referring now to FIG. 8A, a first embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of triangular strips 801 continuously arranged in a parallel and extending manner.

Referring now to FIG. 8B, a second embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of semi-cylindrical strips 802 continuously arranged in a parallel and extending manner.

Referring now to FIG. 8C, a third embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of conical protrusions 803 (in a pyramid shape) continuously arranged in an array manner.

Referring now to FIG. 8D, a fourth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of spherical protrusions 804 continuously arranged in an array manner.

Referring now to FIG. 8E, a fifth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of round-tip protrusions 805 continuously arranged in an array manner.

Referring now to FIG. 8F, a sixth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of triangular strips 806 non-continuously arranged in a parallel and extending manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Referring now to FIG. 8G, a seventh embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of triangular strips 807 non-continuously arranged in a parallel and extending manner according to an equal-spacing pattern.

Referring now to FIG. 8H, an eighth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of semi-cylindrical 808 non-continuously arranged in a parallel and extending manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Referring now to FIG. 8I, a ninth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of semi-cylindrical strips 809 non-continuously arranged in a parallel and extending manner according to an equal-spacing pattern.

Referring now to FIG. 8J, a tenth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of conical protrusions 810 (in a pyramid shape) non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Referring now to FIG. 8K, an eleventh embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of conical protrusions 811 (in a pyramid shape) non-continuously arranged in an array manner according to an equal-spacing pattern.

Referring now to FIG. 8L, a twelfth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of spherical protrusions 812 non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Referring now to FIG. 8M, a thirteenth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of spherical protrusions 813 non-continuously arranged in an array manner according to an equal-spacing pattern.

Referring now to FIG. 8N, a fourteenth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of round-tip protrusions 814 non-continuously arranged in an array manner according to a controllable density-varying pattern of unequal-spacing, which is sparse outside and dense inside. Such an arrangement of the micro-structures is particularly suitable to dual-side edge lighting, i.e. to the light-guiding layer having two light-introducing surfaces located laterally by opposing to each other.

Referring now to FIG. 8O, a fifteenth embodiment of the micro-structures applicable to be constructed on the light-exiting surface and/or the reflective surface of the uniform reflective light-guide apparatus 1 in accordance with the present invention is schematically perspective shown. In this embodiment, the micro-structures can include a plurality of round-tip protrusions 815 non-continuously arranged in an array manner according to an equal-spacing pattern.

Figure 9:
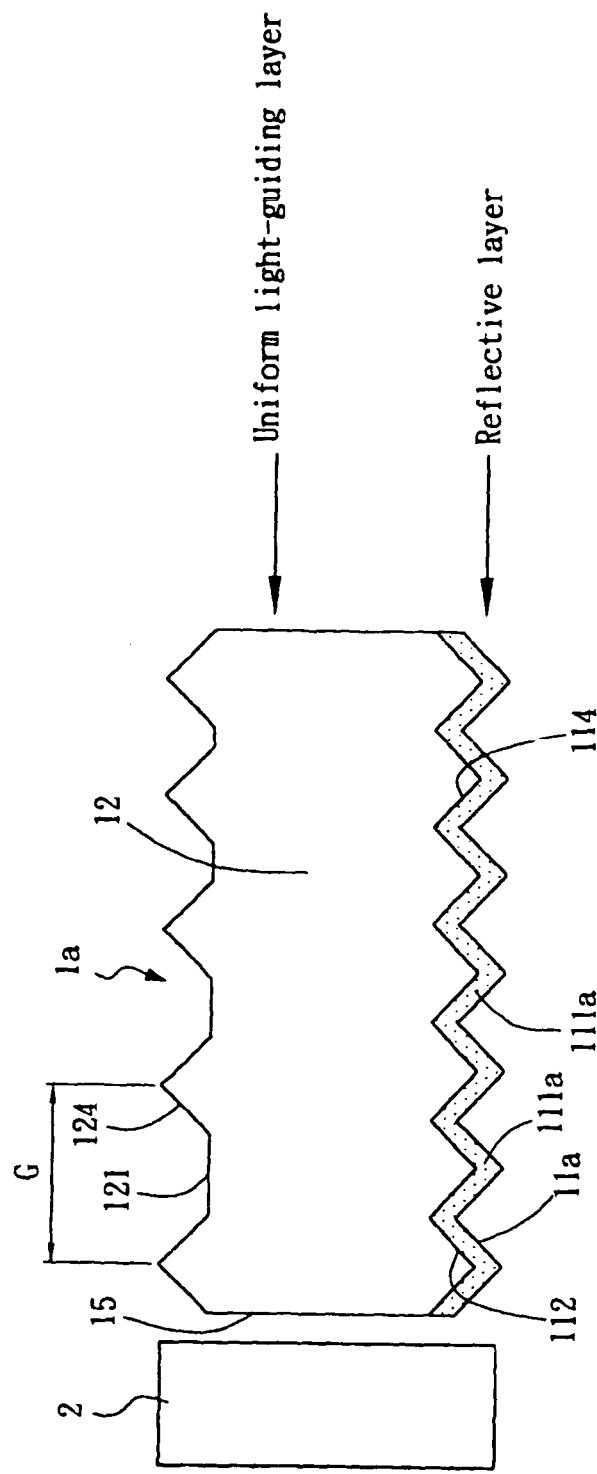
FIG. 9 shows schematically another embodiment of the uniform reflective light-guide apparatus with micro-structure in accordance with the present invention.

Referring now to FIG. 9, another embodiment of the uniform reflective light-guide apparatus 1a with micro-structure in accordance with the present invention is schematically shown. In this embodiment, micro-structures 114, 124 are constructed respectively to the light-exiting surface 121 of the light-guiding layer 12 and the reflective surface 112 interfacing the reflective layer 11 and the light-guiding layer 12. In particular, the micro-structures 114 on the reflective surface 112 are arranged continuously, while the micro-structures 124 on the light-exiting surface 121 are arranged non-continuously according to a density-varying pattern. The density-varying pattern of the micro-structures 124 is shown to have larger intervals G at the end thereof closing to the light-introducing surface 15, and have smaller intervals G for the adjacent micro-structures 124 located away from the light-introducing surface 15. Upon such an arrangement in density of the micro-structures 124, the exiting lights can be much more uniform, and the shortcoming in bright spots close to the light-introducing surface 15 can thus be overcome. In addition, when the interval G of the non-continuous micro-structures 124 on the light-exiting surface 121 is ranged between 0~1.4 mm and when an appropriate optical film (not shown in the figure) is applied to adhere on the light-exiting surface 121, possible line defects on the light-exiting surface 121 can be completely avoided. Similarly, in the case that a similar non-continuous density-varying pattern is applied to the micro-structures 114 on the reflective surface 112, the comparable light uniformity can also be achieved.

Figure 10:
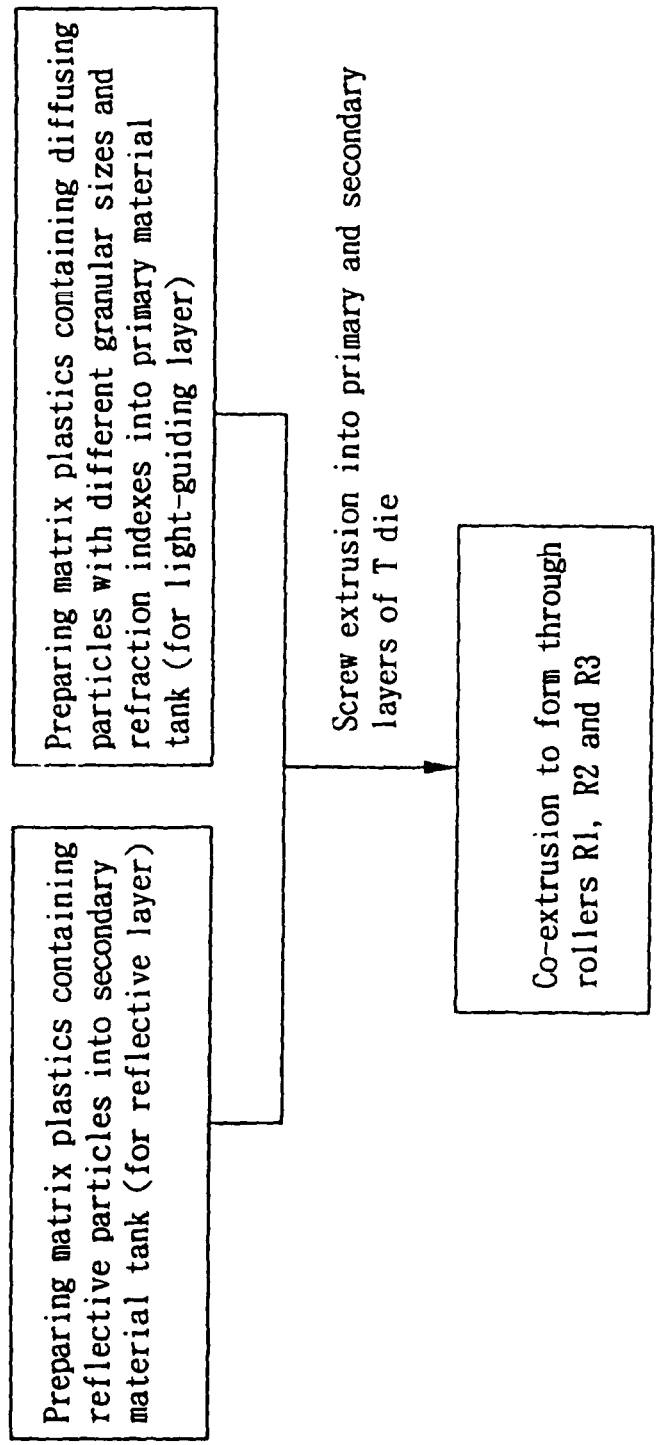
FIG. 10 is a flowchart of a co-extrusion process to manufacture the uniform reflective light-guide apparatus with micro-structure in accordance with the present invention.

Referring now to FIG. 10 and FIG. 11, an embodiment of a co-extrusion process for manufacturing the uniform reflective light-guide apparatus with micro-structure in accordance with the present invention is shown in a flowchart and a schematic block diagram, respectively. The doublee-layer laminating structure shown in FIG. 4 is typically used to explain how this co-extrusion process can produce the light-guide apparatus 1 as a unique piece. First of all, prepare the matrix plastics for forming the reflective layer 11 and an appropriate amount of reflective particles 111 in a material tank 21 of a secondary extrusion machine. On the other hand, prepare the matrix plastics for forming the light-guiding layer 12 and a proper amount of diffusing particles 122 with various granular sizes and various refraction indexes in a material tank 22 of a primary extrusion machine. Then, materials in the material tanks 21, 22 are further being screw extrusion mixed (24), respectively, before being sent to be extruded into respective layers of the T die 25. The materials mixed with corresponding particles or beads are simultaneously extruded out of the T Die 25 as a laminating form and are further rolled to form consequently by the rollers R1, R2 and R3. The micro-structures on the upper surface (the light-exiting surface) or the lower surface (the reflective surface) is pressed to set by the micro-structure pattern prepared on the roller surface of R1, R2 and/or R3. Then, the "all-in-one" main plate body of the light-guide apparatus 1 are formed. By compared to the conventional coating process which coats a reflective layer onto the light-guiding layer, the "all-in-one" co-extrusion process provided by the present invention can be more easily as an advanced manufacturing process.

Referring now to FIG. 12, a block diagram for a process to form a coarse surface on the light-exiting surface in accordance with the present invention is shown. In the present invention, the surface roughness for the coarse surface or matted surface of the light-exiting surface (i.e. the upper surface of the light-guiding layer) can be controlled by adjusting the sandblasting apparatus 31 by regulating the sandblasting pressure p, sandblasting velocity v, and the distant d between the sandblasting nozzle 32 and the roller surface 33. The roller surface 33 with a predetermined surface roughness can then be used as the micro-structure pattern for rollers R1, R2 and/or R3. The surface roughness of the coarse surface will affect the electrostatic adhesion between the light-exiting surface of the light-guide apparatus of the present invention and the optical members, and the light uniformity of the light-guide apparatus. Table 2 lists a typical example.

TABLE 2

Adhesion relation between surface roughness of coarse surfaces (light-exiting surfaces) and optical members

| | Example A | Example B | Example C | Example D | Example E |
|---|---|---|---|---|---|
| d (mm) | 220 | 220 | 220 | 220 | 220 |
| p (MPa) | 0.38 | 0.38 | 0.38 | 0.38 | 0.38 |
| v (m/min) | 15 | 12 | 8 | 4 | 1 |
| Surface roughness Ra (μm) | 0.07 | 0.46 | 1.35 | 2.21 | 2.52 |
| Adhesion of optical members | Easy | Fair | Difficult | Difficult | Difficult |

In Table 2, when the surface roughness (Ra) of the light-exiting surface of the apparatus of the present invention is less than 0.46 μm, the adhesion between the light-exiting surface and the optical member will become easier and, thus scratches in between become highly possible. When Ra is greater than 2.21 μm, the light output at the light-exiting surface will increase but only to decrease the light uniformity of the apparatus. Further, when Ra is greater than 6 μm, the lighting quality of the apparatus might be hard to pass the manufacturer's QC. Therefore, in the present invention, the surface roughness of the coarse surface formed on the light-exiting surface of the light-guide apparatus in accordance with the present invention is limited to a range between 0.46 μm and 2.21 μm, preferably the range between 1 μm and 2.21 μm.

In the present invention, the plastics, the matrix plastics, or say the base matrix for the light-guiding layer and the reflective layer can be selected from, but not limited to, appropriate plastics available in the market, such as polymethylmethacrylate (PMMA), polycarbonate (PC), polyethylene terephthalate (PET), MS and so on. The diffusing particles for the light-guiding layer can be also selected from, but not limited to, appropriate plastics particles available in the market, such as PMMA particles, PC particles, PET particles, MS particles and so on. Similarly, the reflective particles can be selected from, but not limited to, appropriate materials available in the market, such as $SiO_2$ particles, $TiO_2$ particles and so on.

Regards the co-extrusion process for producing the light-guide apparatus of the present invention, various advantages can be obtained, such as the unique-piece plate body, high light utilization efficiency, low light loss, no need of additional reflective plate and brightness-enhancing films (BEF), simple structuring, less expanding on the backlight module, less adhesion to the optical members, and plenty optical merits in light uniformity, luminance and user comfort.

Referring now to FIG. 13A through FIG. 13I, different light reflection patterns on different micro-structures with respect to various incident angles (ranged from 10 degrees to 80 degrees) for the uniform reflective light-guide apparatus in accordance with the present invention are schematically shown. In order to evaluate the effect of the micro structured light-exiting surface and/or reflective surface with various width-to-depth ratios for the micro-structures upon the light-emitting performance of the uniform reflective light-guide apparatus of the present invention, a simulation evaluation method is introduced, in accordance with the present invention. In this method, the simulated light-guide apparatus with micro-structure is designed to have a light-exiting surface 121b on top surface of the light-guiding layer 12b and a reflective surface 112b located at the conjunction surface of the reflective layer and the light-guiding layer. On the light-exiting surface 121b and/or the reflective surface 112b, different depth (H) to width (P) ratios are assigned to the corresponding micro-structures 124b. Further, 0 degree of the incident ray is defined to coincident with the normal line, which is perpendicular to the light-exiting surface 121b. Simulations are formulated by having 11 rays 20b originating at the interior of the light-guiding layer 12b, parallel by the same predetermined spacing, to be sent upward along the 0 degree direction to hit on the light-exiting surface 121b. Simulation results are to analyze the reflection, refraction and/or light-emitting of these 11 rays upon the micro-structures 124b on the light-exiting surface 121b and the micro-structures (embodied as a smooth surface of the reflective surface 112b, and the critical concern is how many rays 20b would be emitted out from the light-exiting surface 121b within a predetermined length (the horizontal length of the light-exiting surface 121 in this simulation).

As shown in FIG. 13A, the micro-structures 124b on the light-exiting surface 121 has a depth-to-width ration (H1/P1) of 0.088, and the reflective surface 112b is simulated as a smooth flat surface without any meaningful micro-structure. When the incident angle is zero, all 11 rays 20b would penetrate the light-exiting surface 121b. The lable "11" at the lower right corner of FIG. 13A indicates the number of the rays 20b to be emitted from the light-exiting surface 121b.

As the simulations go, the incident angle of the rays 20b under the micro-structures 124b (the light-exiting surface 121b as well) is increased by an increment of 10 degree clockwise.

As shown in FIG. 13B, when the incident angle is increased to 10 degree for these 11 rays 20b, all the 11 rays 20b would penetrate the light-exiting surface 121b. Hence, the number count at the lower right corner is shown to be "11".

As shown in FIG. 13C, when the incident angle is increased to 20 degree for these 11 rays 20b, all the 11 rays 20b would also penetrate the light-exiting surface 121b. Hence, the number count at the lower right corner is still shown to be "11".

Then, as shown in FIG. 13D, when the incident angle is increased to 30 degree for these 11 rays 20b, only 7 of these 11 rays 20b can penetrate the light-exiting surface 121b. Hence, the number count at the lower right corner is now shown to be "7".

Similarly, in the following simulations of increasing the incident angle from 40 to 80 degree by an increment of 10 degree, the results are shown respectively from FIG. 13E to FIG. 13I. The corresponding number counts at respective lower right corners of related figures are read as 10, 2, 8, 2 and 3.

Finally, to sum all the numbers of rays leaving the light-exiting surface 121b in the aforesaid simulations, the summation number "65" is obtained. When the summation number goes high, it implies that the structure simulated as above can provide higher light extraction efficiency and thus ensure the extraction performance.

According to the aforesaid evaluation method, comparisons are made to various micro-structures of the light-exiting surface with different H1/P1 ratios and also to various micro-structures of the reflective surface with different H1/P1 ratios. Based on the aforesaid simulation setup (from FIG. 13A through FIG. 13I), the summation count for the total number of the leaving rays are listed as follows in Table. 3.

TABLE 3

Summation count for light-exiting surface and reflective surface with different micro-structures having various depth-to-width ratios

| Specimen | H1/P1 | H2/P2 | (H1/P1)* (H2/P2) | Summation count |
|---|---|---|---|---|
| 1 | 0.088 | Flat surface | | 65 |
| 2 | 0.088 | 0.088 | 7.74E−03 | 81 |
| 3 | 0.088 | 0.182 | 1.60E−02 | 99 |
| 4 | 0.088 | 0.288 | 2.53E−02 | 99 |
| 5 | 0.088 | 0.419 | 3.69E−02 | 95 |
| 6 | 0.088 | 0.596 | 5.24E−02 | 94 |
| 7 | 0.088 | 0.866 | 7.62E−02 | 92 |
| 8 | 0.182 | Flat surface | | 64 |
| 9 | 0.182 | 0.088 | 1.60E−02 | 91 |
| 10 | 0.182 | 0.182 | 3.31E−02 | 99 |
| 11 | 0.182 | 0.288 | 5.24E−02 | 99 |
| 12 | 0.182 | 0.419 | 7.63E−02 | 99 |
| 13 | 0.182 | 0.596 | 1.08E−01 | 94 |
| 14 | 0.182 | 0.866 | 1.58E−01 | 85 |
| 15 | 0.288 | Flat surface | | 57 |
| 16 | 0.288 | 0.088 | 2.53E−02 | 93 |
| 17 | 0.288 | 0.182 | 5.24E−02 | 96 |
| 18 | 0.288 | 0.288 | 8.29E−02 | 96 |
| 19 | 0.288 | 0.419 | 1.21E−01 | 90 |
| 20 | 0.288 | 0.596 | 1.72E−01 | 86 |
| 21 | 0.288 | 0.866 | 2.49E−01 | 84 |
| 22 | 0.419 | Flat surface | | 50 |
| 23 | 0.419 | 0.088 | 3.69E−02 | 90 |
| 24 | 0.419 | 0.182 | 7.63E−02 | 99 |
| 25 | 0.419 | 0.288 | 1.21E−01 | 96 |
| 26 | 0.419 | 0.419 | 1.76E−01 | 86 |
| 27 | 0.419 | 0.596 | 2.50E−01 | 89 |
| 28 | 0.419 | 0.866 | 3.63E−01 | 89 |
| 29 | 0.596 | Flat surface | | 52 |
| 30 | 0.596 | 0.088 | 5.24E−02 | 95 |
| 31 | 0.596 | 0.182 | 1.08E−01 | 98 |
| 32 | 0.596 | 0.288 | 1.72E−01 | 88 |
| 33 | 0.596 | 0.419 | 2.50E−01 | 87 |
| 34 | 0.596 | 0.596 | 3.55E−01 | 84 |
| 35 | 0.596 | 0.866 | 5.16E−01 | 83 |

In Table 3, the H1 is a depth of the micro-structure of the light-exiting surface, the P1 is a width of the micro-structure of the light-exiting surface, the H2 is a depth of the micro-structure of the reflective surface, and the P2 is a width of the micro-structure of the reflective surface. The high number in the summation count implies better extraction efficiency can be provided by the corresponding arrangement of the light-exiting surface and the reflective surface. In Table 3, specimens with series number 3~7, 9~13, 16~19, 23~25 and 30~31 all have the summation counts larger than 90, which implies a better lamination performance and also an up-grade of luminance of the corresponding backlight module. After processing a regression analysis upon H/P ratios for those specimens with summation counts over 90, following criterion is obtained.

$$1.6E-02 \leq (H1/P1)*(H2/P2) \leq 1.21E-01$$

When the micro-structures on the light-exiting surface or the reflective surface of the uniform reflective light-guide apparatus in accordance with the present invention satisfy the foregoing criterion, a higher (i.e. satisfied) luminance of the backlight module can be assured. Further, P2 is preferred to be ranged between 80 μm and 250 μm. If P2 is less than 80 μm, then yield of the micro-structures from the roller in the co-extrusion process would be reduced. On the other hand, if P2 is larger than 250 μm, line defects would be highly possible on the light-exiting surface.

Referring now to FIG. 14, an embodiment of an LED display having the uniform reflective light-guide apparatus in accordance with the present invention is schematically shown. The LCD display includes a backlight module and an LCD panel 57 located above the backlight module. The backlight module further includes an edge light source 2, an optical film 590 and the uniform reflective light-guide apparatus 1 as shown in FIG. 9. The apparatus 1a is a one-piece double-layer laminating plate structure and includes a light-guiding layer 12 and a reflective layer 11a. A light-introducing surface 15 and a light-exiting surface 121 are defined laterally to the light-guiding layer 12. The light-introducing surface 15 is to introduce lights of the edge light source 2 into the light-guiding layer 12. The reflective layer 11a can reflect the incident rays from the light-guiding layer 12 back to the light-guiding layer 12. The light-exiting surface 121 for allowing portion of lights to leave the light-guiding layer 12 is located at the top surface of the light-guiding layer 12. micro-structures 124 and 114 are constructed on the light-exiting surface 121 and the reflective surface 112, respectively. The optical film 590 is to cover the light-exiting surface 121 so as to improve the user comfort and to enhance the light uniformity. The micro-structures 124 on the light-exiting surface 121 can prevent the optical film 590 from sticking on the light-exiting surface 121, so that possible scratched and poor appearance therefrom can be avoided. The LCD panel 57 is located at a side of the optical film 590, which the side is far from the light-guiding layer 12.

While the present invention has been particularly shown and described with reference to a preferred embodiment, it will be understood by those skilled in the art that various changes in form and detail may be without departing from the spirit and scope of the present invention.

We claim:

1. A uniform reflective light-guide apparatus with micro-structure, for accompanying an edge light source, comprising:
    a light-guiding layer, further defining a light-introducing surface and a light-exiting surface, the light-introducing surface being for allowing entrance of lights from the edge light source into the light-guiding layer, the light-exiting surface being perpendicular to the light-introducing surface for allowing at least a portion of the lights in the light-guiding layer to leave the light-guide apparatus therefrom; and
    a reflective layer for reflecting the lights back to the light-guiding layer;
    the uniform reflective light-guide apparatus characterized on that the reflective layer and the light-guiding layer are manufactured integrally into a double-layer laminating plate by a co-extrusion process so as to avoid possible existence of an air spacing between the reflective layer and the light-guiding layer, a reflective surface is defined to an interface between the reflective layer and the light-guiding layer, and a three-dimensional micro-structure is constructed on the reflective surface;
    wherein a difference in refraction index (Δn) between the reflective layer and the light-guiding layer is ranged between 0.05 and 1;
    wherein the light-exiting surface has thereon another micro-structure, and the micro-structure of the light-exiting surface and the microstructure of the reflective surface satisfy the following two criteria:

$$0.016 \leq (H1/P1)*(H2/P2) \leq 0.121 \quad (1)$$

wherein the H1 is a depth of the micro-structure of the light-exiting surface, the P1 is a width of the micro-structure of the light-exiting surface, the H2 is a depth of the micro-structure of the reflective surface, and the P2 is a width of the micro-structure of the reflective surface; and $$0.02 < Rh(1/H2) < 0.5, \quad (2)$$

wherein the Rh is a thickness of the reflective layer.

2. The uniform reflective light-guide apparatus with micro-structure according to claim 1, further satisfying the following criterion:
    0.03<H2/P2<0.8, wherein the P2 is said width of said micro-structure of said reflective surface.

3. The uniform reflective light-guide apparatus with micro-structure according to claim 1, wherein said micro-structure of said light-exiting surface is a non-continuous micro-structure commonly having an interval G in between thereof ranged from 0 to 1.4 mm, and said P2 is ranged between 80 μm and 250 μm.

4. The uniform reflective light-guide apparatus with micro-structure according to claim 1, further including at least one of the following:
    a plurality of diffusing particles, mixed in said light-guiding layer;
    two plastics with different refractive indexes, mixed in said reflective layer;
    a plurality of reflective particles, mixed in said reflective layer; and
    one of a coarse surface and a matted surface with a controllable transmittance, formed on said light-exiting surface.

5. The uniform reflective light-guide apparatus with micro-structure according to claim 4,
    wherein a difference in refraction index (Δn) between said diffusing particles and any of said two plastics as a base matrix for said light-guiding layer is 0.04<Δn<0.1, a granular size for said diffusing particles is ranged between 2 μm and 10 μm, and a refraction index for the any of said two plastics is ranged between 1.42 and 1.63, in the case that said light-guiding layer includes said diffusing particles;
    wherein a mixture ratio for said two plastics is about 7:3, in the case that said reflective layer is mixed with said two plastics with different refraction indexes;
    wherein a refraction index for said reflective particles is ranged from 2.2 to 3.2, a weight proportion for said reflective particles is less than 0.5%, a granular size for said reflective particles is ranged from 4-50 μm, and a refraction index for the any of said two plastics of said reflective layer is ranged from 1.6-2.5, in the case that said reflective layer is mixed with said reflective particles; and wherein a surface roughness (Ra) for said light-exiting surface is 1 μm<Ra<6 μm, in the case that said light-exiting surface includes said coarse surface.

6. The uniform reflective light-guide apparatus with microstructure according to claim 4, wherein, when said light-exiting surface includes said coarse surface, said coarse surface of said light-exiting surface has a limitation in a surface roughness (Ra) of 1 μm<Ra<2.21 μm.

7. The uniform reflective light-guide apparatus with microstructure according to claim 1, wherein one of both said micro-structures for said light-exiting surface and said reflective surface is selected from the group of:
  a plurality of triangular strips continuously arranged in a parallel and extending manner;
  a plurality of semi-cylindrical strips continuously arranged in a parallel and extending manner;
  a plurality of conical protrusions continuously arranged in an array manner;
  a plurality of spherical protrusions continuously arranged in an array manner;
  a plurality of round-tip protrusions arranged in an array manner;
  a plurality of triangular conical strips non-continuously arranged in a parallel and extending manner according to a controllable density-varying pattern of unequal-spacing, sparse outside and dense inside;
  a plurality of triangular conical strips non-continuously arranged in a parallel and extending manner according to an equal-spacing pattern;
  a plurality of semi-cylindrical strips non-continuously arranged in a parallel and extending manner according to a controllable density-varying pattern of unequal-spacing, sparse outside and dense inside;
  a plurality of semi-cylindrical strips non-continuously arranged in a parallel and extending manner according to an equal-spacing pattern;
  a plurality of conical protrusions non-continuously arranged in an array manner according to a controllable density-varying pattern of unequal-spacing, sparse outside and dense inside;
  a plurality of conical protrusions non-continuously arranged in an array manner according to an equal-spacing pattern;
  a plurality of spherical protrusions non-continuously arranged in an array manner according to a controllable density-varying pattern of unequal-spacing, sparse outside and dense inside;
  a plurality of spherical protrusions non-continuously arranged in an array manner according to an equal-spacing pattern; and
  a plurality of round-tip protrusions non-continuously arranged in an array manner according to a controllable density-varying pattern of unequal-spacing, sparse outside and dense inside;
  a plurality of round-tip protrusions non-continuously arranged in an array manner according to an equal-spacing pattern.

8. The uniform reflective light-guide apparatus with microstructure according to claim 1, wherein said micro-structure of said light-exiting surface and said microstructure of said reflective layer are arranged directionally in a manner selected from the group of a parallel arrangement and an orthogonal arrangement.

9. A backlight module having a uniform reflective light-guide apparatus, comprising:
  an edge light source;
  a light-guiding layer, further defining a light-introducing surface and a light-exiting surface, the light-introducing surface being for allowing entrance of lights from the edge light source into the light-guiding layer, the light-exiting surface being perpendicular to the light-introducing surface for allowing at least a portion of the lights in the light-guiding layer to leave the light-guide apparatus therefrom;
  a reflective layer for reflecting the lights back to the light-guiding layer; and
  an optical film to cover the light-exiting surface;
  the backlight module characterized on that:
  the reflective layer and the light-guiding layer are manufactured integrally into a double-layer laminating plate by a co-extrusion process so as to avoid possible existence of an air spacing between the reflective layer and the light-guiding layer, a reflective surface is defined to an interface between the reflective layer and the light-guiding layer, and a three-dimensional micro-structure is constructed on the reflective surface;
  wherein a difference in refraction index (Δn) between the reflective layer and the light-guiding layer is ranged between 0.05 and 1;
  wherein the light-exiting surface has thereon another micro-structure, and both the micro-structure of the light-exiting surface and the microstructure of the reflective surface satisfy the following criteria:

$$b\ 0.016 \leq (H1/P1)*(H2/P2) \leq 0.121 \tag{1}$$

in which the H1 is a depth of the micro-structure of the light-exiting surface, the P1 is a width of the micro-structure of the light-exiting surface, the H2 is a depth of the micro-structure of the reflective surface, and the P2 is a width of the micro-structure of the reflective surface; and $$0.02 < Rh(1/H2) < 0.5, \tag{2}$$

wherein the Rh is a thickness of the reflective layer.

10. An LCD display having uniform reflective light-guide apparatus, comprising:
  an edge light source;
  a light-guiding layer, further defining a light-introducing surface and a light-exiting surface, the light-introducing surface being for allowing entrance of lights from the edge light source into the light-guiding layer, the light-exiting surface being perpendicular to the light-introducing surface for allowing at least a portion of the lights in the light-guiding layer to leave the light-guide apparatus therefrom;
  a reflective layer for reflecting the lights back to the light-guiding layer;
  an optical film to cover the light-exiting surface; and
  an LCD panel, located at a side of the optical film opposing to the light-guiding layer;
  the LCD display characterized on that:
  the reflective layer and the light-guiding layer are manufactured integrally into a double-layer laminating plate by a co-extrusion process so as to avoid possible existence of an air spacing between the reflective layer and the light-guiding layer, a reflective surface is defined to an interface between the reflective layer and the light-guiding layer, and a three-dimensional micro-structure is constructed on the reflective surface;
  wherein a difference in refraction index (Δn) between the reflective layer and the light-guiding layer is ranged between 0.05 and 1;

wherein the light-exiting surface has thereon another micro-structure, and both the micro-structure of the light-exiting surface and the microstructure of the reflective surface satisfy the following two criteria:

$$0.016 \leq (H1/P1)*(H2/P2) \leq 0.121 \quad (1)$$

in which the H1 is a depth of the micro-structure of the light-exiting surface, the P1 is a width of the micro-structure of the light-exiting surface, the H2 is a depth of the micro-structure of the reflective surface, and the P2 is a width of the micro-structure of the reflective surface; and $$0.02 < Rh(1/H2) < 0.5, \quad (2)$$

wherein the Rh is a thickness of the reflective layer.

* * * * *